United States Patent [19]

Moyer

[11] 4,097,844
[45] Jun. 27, 1978

[54] OUTPUT CIRCUIT FOR A DIGITAL CORRELATOR

[75] Inventor: Norman E. Moyer, Newport Beach, Calif.

[73] Assignee: Hughes Aircraft Company, Culver City, Calif.

[21] Appl. No.: 784,499

[22] Filed: Apr. 4, 1977

[51] Int. Cl.² .......... G06F 7/04; G05B 1/03; H03K 4/02; H03K 5/20
[52] U.S. Cl. .......... 340/146.2; 307/221 R; 307/297; 328/93; 328/110; 328/186; 364/728; 364/824
[58] Field of Search .......... 307/203, 216, 220 R, 307/220 F, 220 C, 221 R, 221 C, 227, 297, 304; 328/37, 92, 93, 94, 105, 106, 110, 157, 158, 186; 340/146.2; 364/571, 728, 824

[56] References Cited

U.S. PATENT DOCUMENTS

| | | | |
|---|---|---|---|
| 3,517,175 | 6/1970 | Williams | 340/146.2 X |
| 3,598,979 | 8/1971 | Moreau | 307/221 R |
| 3,622,987 | 11/1971 | Borkan | 340/146.2 |
| 3,670,151 | 6/1972 | Lindsay et al. | 364/728 |
| 3,760,355 | 9/1973 | Bruckert | 340/146.2 |
| 3,831,013 | 8/1974 | Alsup et al. | 364/728 |
| 3,935,439 | 1/1976 | Buss et al. | 364/824 |
| 3,970,875 | 7/1976 | Leehan | 307/297 X |
| 3,978,473 | 8/1976 | Pastoriza | 307/297 X |
| 4,016,434 | 4/1977 | De Filippi | 307/297 |

Primary Examiner—Larry N. Anagnos
Attorney, Agent, or Firm—W. J. Adam; W. H. MacAllister

[57] ABSTRACT

An analog output circuit for a digital correlator that may be completely integrated with the digital correlator on a single CMOS/LSI chip. The output circuit includes a compensating arrangement so that its output voltage is substantially unaffected by internal processing variables between different chips or by external variables such as temperature or supply voltages. The circuit includes a reference MOS unit and a correlation MOS unit each including parallel arranged PMOS transistors respectively coupled in series with first and second NMOS transistors. An operational amplifier biased to a voltage $V_{REF}$ is coupled between the reference MOS unit and the gates of the first and second NMOS transistors. The circuit operates to bias the gate of the second NMOS transistor so that constant output voltage steps are provided in the series path between the correlation MOS unit and the second NMOS transistor as long as variations of operating parameters track each other uniformly between the PMOS units and between the NMOS transistors.

13 Claims, 3 Drawing Figures

OUTPUT CIRCUIT FOR A DIGITAL CORRELATOR

BACKGROUND OF THE INVENTION

1. Field of the Invention

This invention relates to correlator circuits and particularly to an improved CMOS analog output circuit for a digital correlator that may be placed on a single chip and provides an accurate voltage representative of the number of correlations as applied to the gates of the transistors.

2. Description of the Prior Art

Conventionally, LSI or MSI correlator circuits were formed on several chips and the output switching circuit included a plurality of parallel connected PMOS or NMOS transistors in turn connected to a fixed load to provide a voltage representative of the number of correlations as applied to the gates of the transistors. Because of the relatively small voltage steps utilized for each correlation, the output signal was substantially affected by operating variables such as temperature and power supply voltages and by processing variables between chips such as photo etching variations, mobility variations or threshold variations. It would be a substantial advantage to the art to provide an LSI or MSI correlator on a single chip that had an analog output circuit that compensates for substantially all variables affecting that circuit so output correlation voltages were maintained constant for each correlation step on any chip or between a plurality of batches of chips.

SUMMARY OF THE INVENTION

The analog output circuit of this invention provides an analog signal that corresponds to the correlation of two sets of digital data in a digital correlator, and is preferably integrated with the digital correlator on a single chip. A correlation unit includes a plurality of parallel connected PMOS transistors which have their current paths connected between a source of positive potential and a common output lead which in turn is connected in series to the drain electrode of a first NMOS transistor where the source is tied to a source of negative potential. The gates of each of the PMOS transistors are coupled to exclusive OR gates in the digital correlator for being biased into conduction in response to correlation signals. The reference unit is the same as the correlator unit except that the number of PMOS parallel connected transistors may vary and the size of the second NMOS transistor may vary. Also, the PMOS transistors are always biased into conduction. The second NMOS transistor has its gate electrode coupled to the gate electrode of the first NMOS transistor. All of the PMOS transistors are biased in their saturation or current source region and the NMOS transistors are biased in their linear region. An operational amplifier referenced to a voltage $V_{REF}$ is coupled between the output of the reference unit and the gates of the first and second NMOS transistors. The correlator outputs, derived from a pair of shift registers applying signals to a plurality of exclusive "OR" gates control each of the PMOS transistors of the correlation unit to provide current flows through the first NMOS transistor representative of the correlation values. In response to processing or operating external variations that track between the reference and correlation units or between the first and second NMOS transistors, the gate of the second NMOS transistor is biased so that its impedance varies proportionally to any current variation in a single PMOS transistor in the correlation unit. Thus, the correlation output voltage change for each correlation step remains constant for not only a single chip but also for different chips. The offset of the operational amplifier is substantially eliminated by selecting the $V_{REF}$ voltage so that the offset is a small fraction of the voltages to be compared.

It is therefore an object of this invention to provide an improved correlator for LSI or MSI fabrication.

It is a further object of this invention to provide a correlator with analog output circuitry on the same chip.

It is a still further object of this invention to provide an analog output circuit for a correlator whose accuracy is substantially unaffected by variables such as temperature, threshold voltage, mobility or photo etching variations.

It is another object of this invention to provide an analog output circuit for a correlator that provides a substantially constant voltage step for each additional correlation value.

It is still another object of this invention to provide an analog output circuit for a correlator that provides consistent output voltages for equal numbers of correlations substantially unaffected by processing variations between chips (such as threshold voltage, geometric differences caused by photo etching, or mobility differences caused by substrate resistivity variations) and by external variations such as ambient temperature and supply voltage.

BRIEF DESCRIPTION OF THE DRAWINGS

These and other objects, features and advantages of the invention itself, will become apparent to those skilled in the art in the light of the following detailed description taken in consideration with the accompanying drawings, wherein like reference numerals indicate like corresponding parts throughout the several parts wherein.

DETAILED DESCRIPTION OF THE INVENTION

Figure 1:
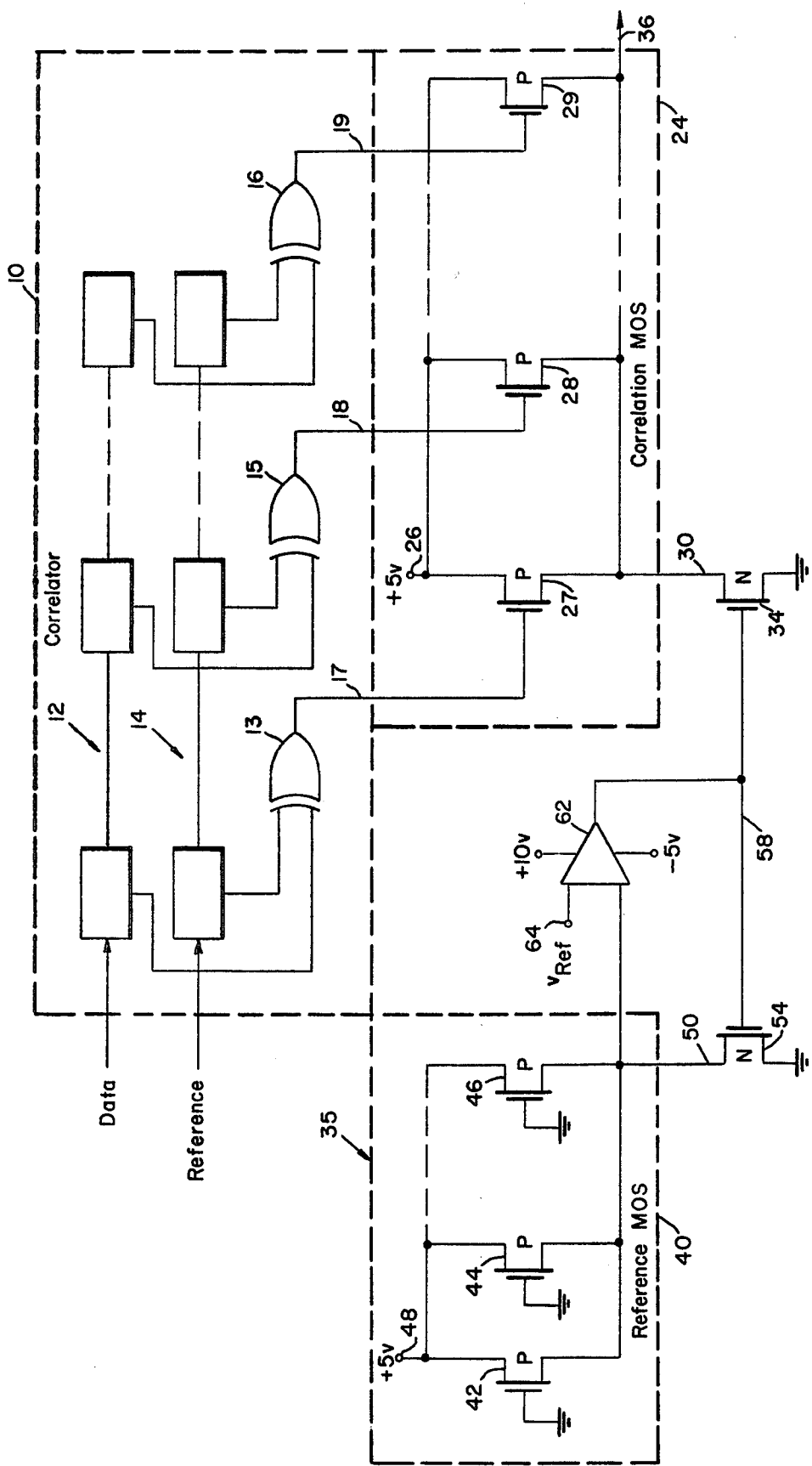
FIG. 1 is a schematic circuit and block diagram of the correlator and analog output circuit in accordance with the invention.

Referring first to FIG. 1, a digital correlator 10 may for example include shift registers 12 and 14 respectively receiving input data and reference data in the form of a series of binary bits to be compared or correlated. Exclusive "OR" circuits such as 13, 15 and 16 are each responsive to the digital value in corresponding stages of the shift registers 12 and 14 and apply in response to a match or correlation, a low level voltage such as 0 volts through a lead such as 17, 18 or 19 to the gate electrodes of corresponding PMOS transistors of a correlation MOS circuit 24. Included in the correlation MOS circuit 24 are a plurality of PMOS transistors such as 27, 28 and 29 with their source electrodes connected to a suitable source of potential such as a +5 volt terminal 26 and with their drain electrodes connected in common to a lead 30. An NMOS transistor 34 has its drain electrode coupled to the lead 30 and its source electrode coupled to a suitable more negative potential such as ground. An output lead 36 is coupled to the lead 30 to apply the correlation voltage to suitable utilization units which may be separate from the correlation chip. The PMOS transistors of the correlation MOS unit 24 are biased in their saturation region when selected to be conductive and the NMOS transistor 34 is biased in its linear region during operation.

The remainder of the circuitry of FIG. 1 is a compensating circuit 35 having the purpose of biasing the gate of NMOS transistor 34 so that its resistance is inversely proportional to the current in a single correlation PMOS transistor so that a constant millivolt change per each correlation step is provided on the output lead 36. A reference MOS circuit 40 includes a plurality of PMOS transistors such as 42, 44 and 46 with their source electrodes connected to a suitable source of potential such as +5 volt terminal and with their drain electrodes connected in common to a lead 50. The gate electrodes of the PMOS transistors of the reference MOS circuit 40 are connected to the potential of a logic "0" from the exclusive OR gates 13, 15 and 16, such as ground. An NMOS transistor 54 has its drain electrode coupled to the lead 50, its source electrode coupled to a suitable reference potential such as ground and its gate electrode coupled through a lead 58 to the gate electrode of NMOS transistor 34. The PMOS transistors of the reference MOS circuit 40 are each biased in their saturation or current source region when conducting and the NMOS transistor is biased in its linear region when operating. In order to regulate the gate voltage on the lead 58, a high gain amplifier and a reference voltage are required so that a suitable operational or differential amplifier 62 is provided with its positive input terminal connected to the lead 50, its negative input terminal connected to a source of reference potential 64 which provides a voltage $V_{REF}$ and its output terminal connected to the gate lead 58. The operational amplifier 62 may be supplied by sources of +10 and −5 volts.

The shift registers 12 and 14 may be of any suitable configuration such as a CD 4013 shown on page 14 of the RCA Solid State Data Book Series, 1973 edition and the exclusive OR gates such as 14, 15 and 16 may be of any suitable configuration such as CD 4030 shown on page 11 of the above referenced catalog. The operational amplifier 62 may be of any suitable configuration such as a 741 type fabricated in CMOS structure utilizing conventional CMOS fabrication techniques. The operational amplifier may be of the type used on Motorola chip MC14433 for a three and one half digit A/D converter which includes a CMOS operational amplifier.

Figure 2:
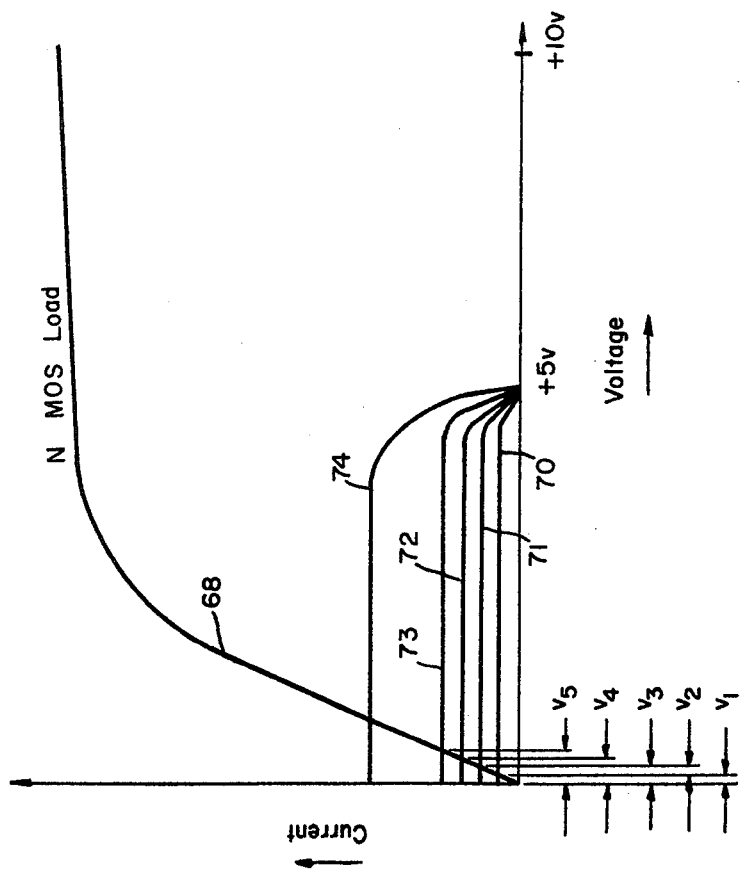
FIG. 2 is a schematic graph of current as a function of voltage showing the NMOS transistor operating in its linear region and the PMOS transistors operating in their saturation regions.

Referring now to FIG. 2, a curve 68 shows the linear operating regions of both of the NMOS transistors 34 and 54 and a curve 70 shows the operating characteristics of one PMOS transistor of either the correlation MOS circuit 24 or the reference MOS circuit 40. Curves 71, 72 or 73 show the cumulative operating characteristics of respectively 2, 3 and 4 PMOS transistors of either circuits 24 or 40. A curve 74 shows the cumulative operating characteristics of an additional number of PMOS transistors such as 8, still well within the linear portion of curve 68, which must include at least the current level for 16 PMOS transistors of circuit 24 biased into conduction. Thus, the PMOS transistors are biased to operate in their constant current regions when conductive and the NMOS transistors are biased to operate in their linear current variation regions. The circuit of FIG. 1 provides a constant millivolt change per correlation step, that is, all $\Delta V = $ constant, substantially unaffected by operating variables and/or processing variables. The voltages $V_4$ and $V_5$ show the cumulative output voltage for respectively 3 and 4 PMOS transistors being biased into conduction. A change in a voltage such as $V_1$ or $V_2$, for example, is prevented because if curves 70 or 71 raise or lower because of parameter variations in circuits 24 and 40 the compensation operation of the circuit of FIG. 1 causes the NMOS transistor 34 (as well as 54) to change the slope of curve 68 to either a lesser or greater slope so that the voltages $V_1$ and $V_2$ have the fixed value determined by the design of the compensating circuit.

Referring now principally back to FIG. 1, an increase of current in lead 50 such as by decreasing thresholds in the PMOS transistors in the reference MOS circuit 40 from the design nominal would cause a voltage rise on the lead 50 except that there is a voltage rise on the lead 58. The lead 50 may normally be about 1 volt with $V_{REF}$ selected at +1.0 volts, the gate lead 58 may normally be at about 7 volts and the voltage on the lead 30 may normally be at about 0 volts. The variable that decreased the threshold of circuit 40 also decreased the threshold of correlation MOS circuit 24 so that increased current flows in lead 30. However, the rise of voltage on the gate lead 58 decreases the resistance of the NMOS transistor 34 so that the voltage change per step remains substantially the same on the lead 30 as the design value or value from a different chip. A similar correction operation either in increasing or decreasing the impedance of the transistor 34 occurs for any uniform change in the operating characteristic in both circuits 40 and 24 and for any uniform change in the operating characteristics of both NMOS transistors 54 and 34. Thus, a substantially constant millivolt change per step is maintained in each chip and between different chips to overcome the effect of either external variables or processing variables.

In the illustrated configuration, minimum offset is utilized by selecting $V_{REF}$ at +1.0 volts causing the offset to be a small fraction of the voltage to be compared on the lead 50. Using the MOS circuit 35, the millivolts/step at node 30 are a function of $V_{REF+OFF-SET}V$ so that a relatively large $V_{REF}$ and small amplifier offset provides increased accuracy. It is to be noted that the two NMOS transistors are operated with different drain voltages. However, as long as the difference in the NMOS operation (due to nonlinearity of the I-V curve and the difference in drain voltages) tracks from chip to chip the circuit has been found to operate satisfactorily.

The circuit holds a constant $\Delta V$ per step in spite of changes in not only external variables but also processing variables such as threshold voltage (affected by surface states, substrate doping, and oxide thickness) and mobility (MOSFET channel conductivity is affected by substrate doping and oxide thickness). The effect of photo etching variations (due to over etching or varying mask dimensions), which change the geometry of the transistors, also cancels out. The geometric layout of this circuit should be such that similar type transistors are as identically placed and oriented as possible, so the PMOS transistors track each other in variations and the NMOS transistors track each other in variations.

Figure 3:
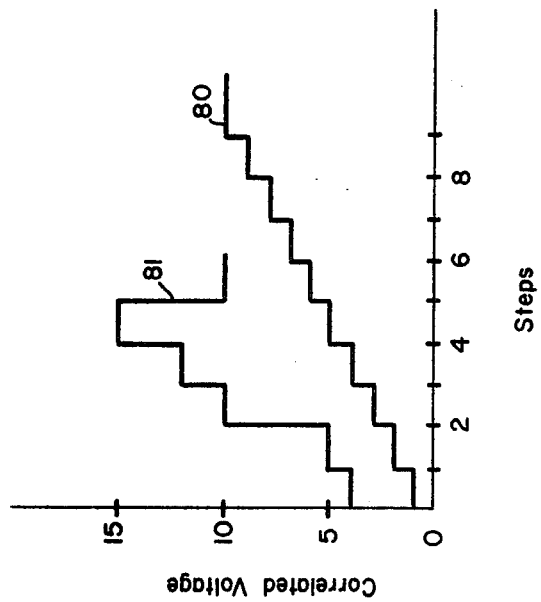
FIG. 3 is a schematic graph of output correlation voltage as a function of correlation steps for further explaining the operation of the analog output circuit in accordance with the invention.

As can be seen in FIG. 3, the correlation values on the output lead 36 as a function of time or of the correlation steps may take the forms such as shown by a curve 80 for one additional correlation for each clock time and as shown by a curve 81 for a varying number of correlations for each clock time. The correlation voltage per step remains substantially constant.

Thus, there has been described an improved analog output circuit for a digital correlator utilizing opposite or complementary type transistors that include a PMOS correlation circuit responsive to the correlator output and connected in series with an NMOS transistor providing a resistive load. A compensating circuit including a reference PMOS circuit and a series coupled NMOS transistor along with an operational or differential amplifier controls the gate of the NMOS transistor connected to the correlator PMOS circuit so that its resistance varies inversely with the current in a single PMOS transistor in the correlation circuit, thus providing a highly accurate correlation output voltage. The invention has been illustrated with CMOS/LSI field effect transistors but it is to be understood that other types of transistors and circuit fabrication are within the scope of the invention. Also, exchange of P and N type transistors or change of the reference voltages from that illustrated in FIG. 1 is within the scope of the invention.

What is claimed is:

1. A circuit responsive to a plurality of correlation signals comprising:
    a correlation circuit including a plurality of transistors having their current paths connected in parallel between a first voltage source and a first common lead, and having their control electrodes responsive to said correlation signals,
    a first load transistor having its current path coupled between said first common lead and a second voltage source, said first load transistor having a control electrode; and
    a compensating circuit coupled to the control electrode of said first load transistor for controlling the resistance of said first load transistor to provide a substantially constant voltage step on said common lead for each parallel transistor biased into conduction.

2. The combination of claim 1 in which said parallel transistors and said load transistors are MOS field effect transistors.

3. A circuit responsive to a correlator having a plurality of output leads comprising:
    a correlation circuit including a plurality of first transistors each having a first load electrode coupled to a first voltage source, a second load electrode coupled to a first common lead and each having a control electrode coupled to a different output lead of said correlator,
    a second transistor having a first load electrode coupled to said first common lead, having a second load electrode coupled to a second voltage source and having a control electrode,
    a reference circuit including a plurality of third transistors each having a first load electrode coupled to a third voltage source, a second load electrode coupled to a second common lead and a control electrode coupled to a fourth voltage source,
    a fourth transistor having a first load terminal coupled to said second common lead, a second load terminal coupled to a fifth voltage source and a control electrode coupled to the control electrode of said second transistor; and
    an operational amplifier having a first input terminal coupled to said second common lead, a second input terminal coupled to a sixth voltage source and an output terminal coupled to the control electrodes of said second and fourth transistors.

4. The combination of claim 3 in which said first and third transistors and said second and fourth transistors are MOS field effect transistors.

5. The combination of claim 4 in which said first and third transistors are PMOS field effect transistors and said second and fourth transistors are NMOS field effect transistors.

6. The combination of claim 3 in which said first through sixth voltage sources are selected so that the first transistors of said correlation circuit and said third transistors of said reference circuit are biased to be current sources when conducting and said second and fourth transistors are biased in their linear resistive region.

7. A circuit responsive to a plurality of correlation signals to provide a correlation voltage comprising:
    correlation means including a plurality of MOS field effect transistors of a first semiconductor type each having a gate electrode responsive to a correlation signal and each having one load electrode coupled to an output lead, and including means to bias the transistors of said correlation means to conduct in their constant current region,
    reference means including a plurality of MOS field effect transistors of said first semiconductor type having one load electrode coupled to a common lead and including means to bias the transistors of said reference means to conduct in their constant current region,
    first and second load MOS field effect transistors of a second semiconductor type respectively coupled in series with said correlation circuit and said reference circuit and having their control electrodes coupled together,
    means for biasing said first and second load transistors in their linear region,
    a source of reference voltage; and
    operational amplifier means having a first input terminal coupled to said common lead, a second input terminal coupled to said source of reference voltage and an output terminal coupled to the control electrodes of said first and second load transistors.

8. The combination of claim 7 in which the transistors of said first semiconductor type are PMOS field effect transistors and the first and second load transistors of said second semiconductor type are NMOS field effect transistors.

9. The combination of claim 7 in which said source of reference voltage is selected so that the amplifier offset voltage is a relatively small fraction of the voltage on said common lead.

10. An analog output circuit for a digital correlator providing a plurality of comparison signals comprising:
    first, second and third sources of voltage,
    a correlation circuit including a plurality of P type field effect transistors each having a gate responsive to a comparison signal, and source and drain electrodes respectively coupled to said first source of voltage and an output lead, a first N type field effect transistor having a gate electrode and having drain and source electrodes respectively coupled to said output lead and said second source of voltage, a reference circuit including a plurality of P type field effect transistors each having a gate electrode coupled to said second source of voltage, and source and drain electrodes respectively coupled to said first source of voltage and a common lead, a second N type field effect transistor having drain and source electrodes respectively coupled to said common lead and said second source of voltage and having a gate electrode coupled to the gate electrode of said first N type transistor; and an operational amplifier having first and second input terminals respectively coupled to said common lead and said third source of voltage and having an output terminal coupled to the gate electrodes of said first and second N type transistors.

11. The combination of claim 10 in which said transistors are integrated on a single CMOS/LSI chip.

12. The combination of claim 10 in which said first, second and third sources of voltage are selected so that said P type transistors are biased in their saturation regions when conducting and said N type transistors are biased in their linear regions.

13. The combination of claim 12 in which the third source of voltage is selected so that the amplifier offset is a small fraction of the voltage on said common lead.

* * * * *